United States Patent
Greenbaum

(10) Patent No.: US 7,032,124 B2
(45) Date of Patent: Apr. 18, 2006

(54) METHOD OF AUTOMATICALLY CORRECTING BROKEN LINKS TO FILES STORED ON A COMPUTER

(76) Inventor: David M. Greenbaum, 1570 Maple St., Clearwater, FL (US) 33755

( * ) Notice: Subject to any disclaimer, the term of this patent is extended or adjusted under 35 U.S.C. 154(b) by 501 days.

(21) Appl. No.: 10/093,559

(22) Filed: Mar. 8, 2002

(65) Prior Publication Data
US 2003/0004978 A1    Jan. 2, 2003

Related U.S. Application Data
(60) Provisional application No. 60/274,811, filed on Mar. 9, 2001.

(51) Int. Cl.
  *G06F 11/00*    (2006.01)
(52) U.S. Cl. .................. 714/5; 714/4; 707/1; 707/200; 707/202
(58) Field of Classification Search .................. 714/4, 714/15; 707/200–205, 2, 1; 711/216, 220
  See application file for complete search history.

(56) References Cited

U.S. PATENT DOCUMENTS

| | | | | |
|---|---|---|---|---|
| 5,758,154 A | * | 5/1998 | Qureshi | 713/1 |
| 5,933,820 A | * | 8/1999 | Beier et al. | 707/1 |
| 6,192,375 B1 | * | 2/2001 | Gross | 700/200 |
| 6,351,741 B1 | * | 2/2002 | Flenniken | 707/2 |
| 6,397,381 B1 | * | 5/2002 | Delo et al. | 717/174 |
| 6,496,837 B1 | * | 12/2002 | Howard et al. | 707/200 |
| 6,615,365 B1 | * | 9/2003 | Jenevein et al. | 714/6 |

* cited by examiner

*Primary Examiner*—Robert Beausoliel
*Assistant Examiner*—Philip Guyton
(74) *Attorney, Agent, or Firm*—The Webb Law Firm

(57) ABSTRACT

A method of correcting broken software links includes providing a computer data storage having target files and master files. Each master file includes a pointer to a storage location where at least one target file called by the master file resides. A link-id is determined for each target file and is stored in each master file configured to call the target file. The target file is then either renamed or moved so that each master file configured to call the target file cannot locate it from the pointer data. The target file is then located on the computer data storage based on a match between the link-id for the target file and the link-id stored in the calling master file. The data comprising the pointer of the master file is then updated whereupon it can locate the target file on the computer data storage.

21 Claims, 10 Drawing Sheets

| POINTER NAME — 46 | MASTER FILE NAME — 48 | POINTER DATA — 50 |
|---|---|---|
| POINTER NAME 1a | 1ST MASTER FILE | C:\FOLDER\TARGET_FILE_1a.EXT |
| POINTER NAME 1b | 1ST MASTER FILE | C:\FOLDER\TARGET_FILE_1b.EXT |
| POINTER NAME 2 | 2ND MASTER FILE | C:\FOLDER\TARGET_FILE_2.EXT |
| POINTER NAME 3 | 3RD MASTER FILE | C:\FOLDER\TARGET_FILE_3.EXT |
| POINTER NAME Xb | X MASTER FILE | C:\FOLDER\TARGET_FILE_Xb.EXT |

| POINTER NAME | MASTER FILE NAME | POINTER DATA | LINK-ID NAME |
|---|---|---|---|
| POINTER NAME 1a | 1ST MASTER FILE | C:\FOLDER\TARGET_FILE_1a.EXT | LINK-ID 1a |
| POINTER NAME 1b | 1ST MASTER FILE | C:\FOLDER\TARGET_FILE_1b.EXT | LINK-ID 1b |
| POINTER NAME 2 | 2ND MASTER FILE | C:\FOLDER\TARGET_FILE_2.EXT | LINK-ID 2 |
| POINTER NAME 3 | 3RD MASTER FILE | C:\FOLDER\TARGET_FILE_3.EXT | LINK-ID 3 |
| --- | --- | --- | --- |
| POINTER NAME Xb | X MASTER FILE | C:\FOLDER\TARGET_FILE_Xb.EXT | LINK-ID Xb |

FIG. 6b

METHOD OF AUTOMATICALLY CORRECTING BROKEN LINKS TO FILES STORED ON A COMPUTER

CROSS REFERENCE TO RELATED APPLICATIONS

This application claims priority from U.S. Provisional Patent Application Ser. No. 60/274,811, filed Mar. 9, 2001.

BACKGROUND OF THE INVENTION

1. Field of the Invention

The present invention relates to correcting broken links between files stored on a Computer Data Storage.

2. Description of Related Art

Many software applications such as Internet based software, Microsoft® Word™, Microsoft® Excel™, Pagemaker®, AutoCAD®, MicroStation®, QuarkXPress®, and others include the ability to link files to each other. For example, a .gif graphical image file may be linked to an HTML file, an Excel spreadsheet, a Word document, and so forth. However, when a file is renamed or moved from its original location, links to that file may be inadvertently broken. For example, after one .gif file is renamed or moved, software applications that utilize this file may all complain that this file is missing.

More and more documents are being composed modularly with many linked components, making document interconnectivity, breaks and necessity for repair thereof increasingly prevalent and important.

Presently, when software applications encounter a broken link, they ordinarily do nothing more than display an error message. Some software applications provide crude tools to help the user locate missing files, but such tools are typically not automated, requiring user intervention or confirmation, and can only handle one file type. Further, existing tools are not always accurate and are tedious, if helpful at all, when multiple broken links must be restored in multiple documents. Presently, no solution exists for automatically re-connecting broken links among varying types of files.

It is, therefore, an object of the present invention to overcome the above problems and others by providing a reliable, automatic method of restoring broken links between files created in a variety of applications. Still other objects of the invention will become apparent to those of ordinary skill in the art upon reading and understanding the following detailed description.

SUMMARY OF THE INVENTION

Accordingly, I have invented a method of correcting broken software file links. The method includes determining a link-id for a first target file that is stored on a computer data storage along with a first master file which, during its execution, calls the first target file. The first master file includes a first pointer that comprises data that enables the first master file to locate the first target file on the computer data storage. A link-id is determined for the first target file and this link-id is stored in the first master file. The first target file is then located on the computer data storage based on a match between the link-id stored in the first master file and the link-id for the first target file. The data of the first pointer is updated so that the updated data enables the first master file to locate the first target file on the computer storage.

The step of locating the first target file occurs after the first target file is amended or moved so that the first master file cannot locate the first target file on the computer data storage from the data comprising the first pointer.

Amending the target file includes amending the file name, amending the file extension, amending a path and/or amending a physical/logical drive of the first target file. Moving the first target file includes moving the first target file to a different physical/logical drive of the computer data storage and/or moving the first target file to a different path on the computer data storage.

Before and after updating the data of the first pointer, said data comprises: respective pre-update and post-update file names of the first target file; respective pre-update and post-update file extensions of the first target file; respective pre-update and post-update physical/logical drives where the first target file is stored on the computer data storage; and/or respective pre-update and post-update paths or folders where the first target file is stored on the computer data storage.

The link-id can be a unique binary sequence or a checksum of the data comprising the first target file. When the link-id is a unique binary sequence, the link-id is stored in the first target file. However, when the link-id is the checksum of the data comprising the first target file, the link-id is not stored in the first target file. Rather, the link-id for the target file is determined again when the target file is being located on the computer data storage.

The method can further include storing a second target file on the computer data storage and determining a link-id for the second target file, where the link-ids of the first and second target files are the same. Thereafter, in connection with reestablishing broken links with the first master file, it is determined that the first and second target files have the same link-ids. The first target file is then located on the computer data storage based on the data comprising the first pointer prior to updating said data and/or a date/time associated with each of the first and second target files.

I have also invented a method of correcting broken software file links. The method includes determining a link-id for each of a plurality of target files stored on a computer data storage along with a plurality of master files, where each target file is called by at least one master file during its execution. The computer data storage further includes for each target file a pointer that is accessible to the at least one master file configured to call said target file. Each pointer includes data regarding a location of its target file on the computer data storage. The link-id determined for each target file is stored in the computer data storage in connection with the at least one master file configured to call the target file. The location of at least one target file on the computer data storage is then determined based on a match between the link-id for said target file and the link-id stored in the computer data storage in connection with the at least one master file configured to call said target file. The data comprising the pointer for said target file is then updated so that said data enables the master file configured to call said target file to locate said target file on the computer data storage at the thus determined location.

The step of determining a location of said target file occurs after said target file is amended or relocated in the computer data storage so that the at least one master file configured to call said target file cannot locate said target file from the pointer for said target file.

Each pointer can be stored in a data structure accessible by the master files. At an appropriate time, the pointer for said target file can be located in the data structure. Said target file can then be located on the computer data storage utilizing the data comprising the pointer for said target file located in the data structure. Alternatively, the pointer for each target file is stored in each master file configured to call the target file.

BRIEF DESCRIPTION OF THE DRAWINGS

FIG. 5b is an illustration of the record structure of the records forming the data structure of FIG. 5a;

FIG. 6b is an illustration of the record structure of the records forming the data structure of FIG. 6a.

DESCRIPTION OF THE INVENTION

The present invention will be described with reference to the accompanying FIGS. where like reference numbers correspond to like elements.

Figure 1:
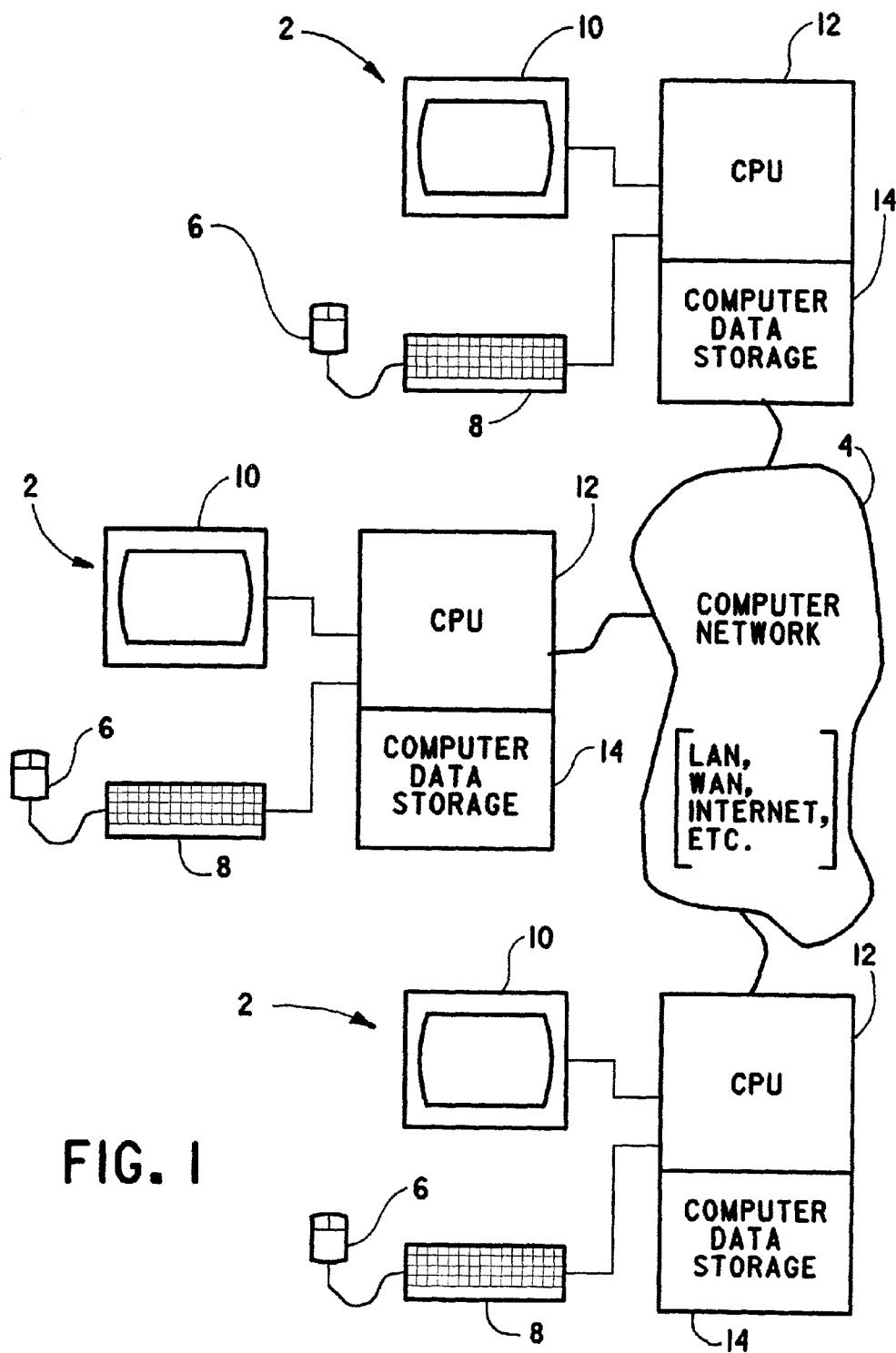
FIG. 1 is a block diagram of a plurality of computers connected together via a computer network.

With reference to FIG. 1, a plurality of computers 2 can be networked together via a computer network 4, such as a local area network (LAN), a wide area network (WAN), the Internet, etc. Each computer 2 includes a pointing device or mouse 6, a keyboard 8 and a display 10 which collectively act as a man-machine interface between the computer 2 and a user thereof. Each computer 2 also includes a central processing unit (CPU) 12 and a computer data storage 14. Each computer data storage 14 can be any desired combination of data storage devices known in the art, such as, without limitation, semiconductor data storage, magnetic data storage and/or optical data storage.

The present invention is embodied in computer software which is configured to run on each computer 2. More specifically, the computer software embodying the present invention can be configured to run on each computer 2, as a stand-alone computer 2 or as a networked computer 2, which is capable of searching its own computer data storage 14 as well as at least part of the computer data storage 14 of one or more other networked computers 2.

Figure 2A:
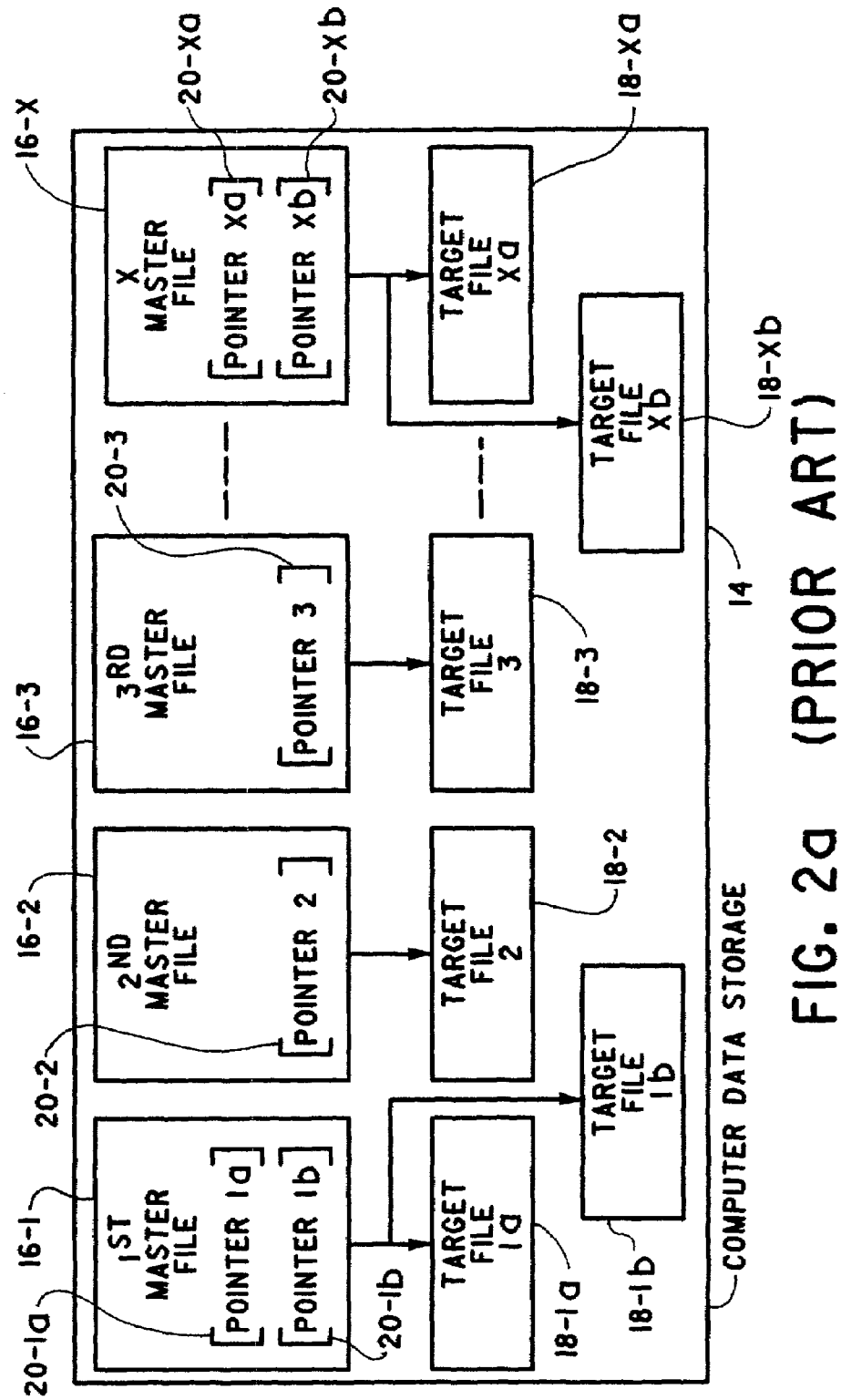
FIGS. 2a and 2b are block diagrams of a method of linking target files and master files in accordance with the prior art.

A prior art method of linking files stored on computer data storage 14 will now be described with reference to FIGS. 2a and 2b. As shown in FIG. 2a, computer data storage 14 can store a plurality of master files 16-1–16-X. Computer data storage 14 can also store a plurality of target files 18-1a–18-Xb associated with master files 16-1–16-X, respectively. Each master file 16 is one which includes links pointing to other files. Each master file 16 is configured so that during execution, it calls or retrieves one or more target files 18 which are pointed to by the master file. It should be appreciated, however, that in a hierarchical file relationship, each file can be a master file, a target file, or both depending on the calling or called relationship of the file with respect to other files. For example, a file can be a master file for one or more target files that it is configured to call, and this same file can be a target file that is called by one or more master files.

To enable it to call appropriate target files 18, each master file 16 includes a pointer 20 to each target file 18 the master file 16 is configured to call during its execution. For example, master file 16-1 includes pointer 20-1a and a pointer 20-1b which point to the storage location of target file 1a 18-1a and the storage location of target file 1b 18-1b, respectively, in computer data storage 14.

Figure 3:
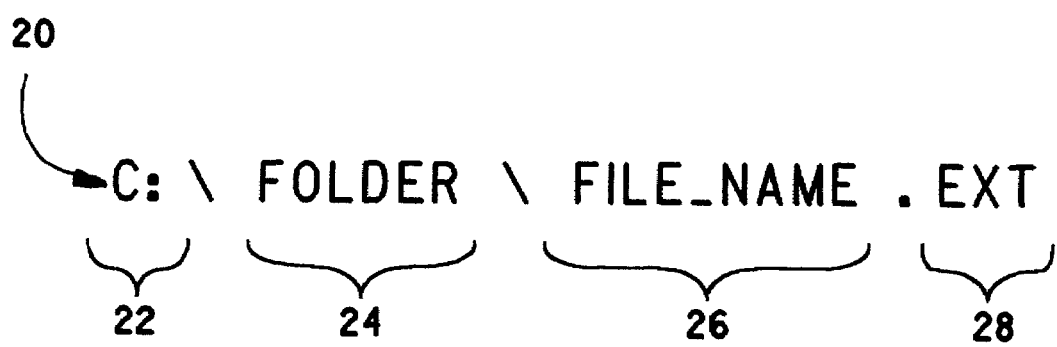
FIG. 3 is an illustration of the structure of a pointer utilized to create links between master files and target files in accordance with the prior art.

As shown in FIG. 3, each pointer 20 includes pointer data, such as physical/logical drive data 22, path data 24, file name data 26 and extension data 28 which collectively define the physical location on computer data storage 14 where the corresponding target file 18 is stored.

During execution, master file 16-1 calls or retrieves target file 1a 18-1a from computer data storage 14. More specifically, master file 16-1 utilizes pointer 20-1a to identify the storage location of target file 1a 18-1a on computer data storage 14. Utilizing techniques known in the art, master file 16-1 searches for target file 1a 18-1a at the storage location of computer data storage 14 referenced by the pointer data of pointer 20-1a. If master file 16-1 locates target file 1a 18-1a, master file 16-1 retrieves target file 1a 18-1a and commences operation in accordance with the data included therein. Similar comments apply in respect of master file 16-1 calling target file 1b 18-1b from a storage location in computer data storage 14 referenced by the pointer data of pointer 20-1b. Each master file 16 stored in computer data storage 14 can include a pointer 20 to the storage location in computer data storage 14 of each target file 18 called by the master file 16.

Figure 2B:
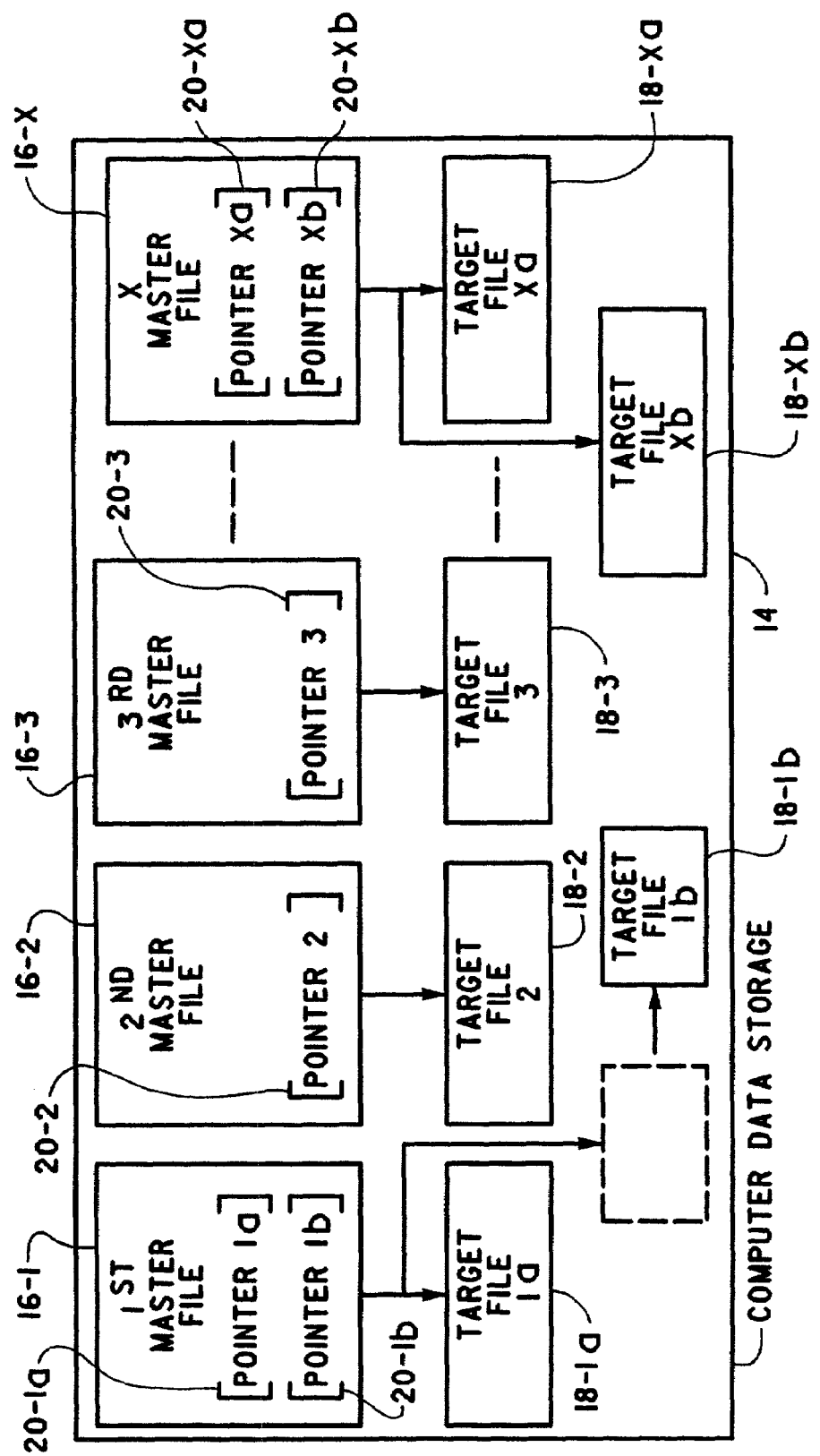

With reference to FIG. 2b and with continuing reference to FIG. 2a, it is well known that if the physical location of a target file 18 in computer data storage 14 changes, the physical/logical drive and/or path of this target file 18 changes. Hence, any pointer 20 to this target file 18 created prior to changing its physical location will no longer include the correct storage location of this target file 18. Similarly, if the file name and/or the extension of a target file 18 changes, any pointer 20 to this target file 18 created prior to such change will no longer include the correct file name or file extension of the target file 18. Hence, when a master file 16 utilizes this pointer 20 to retrieve the target file 18, the target file 18 will not be located by the master file, even if the physical location of the target file remains unchanged.

Moving the physical location of a target file 18 in computer data storage 14, changing the file name and/or changing the file extension of the target file 18 without a corresponding change in each pointer 20 thereto creates a broken link between the target file 18 and each master file 16 configured to call the target file 18. Typically, when a broken link is detected during execution of a master file 16, an on-screen error message is generated which advises the user of computer 2 that a particular target file 18 called by a master file 16 could not be located at the storage location of computer data storage 14 referenced by the pointer data of the corresponding pointer 20 included in the master file 16.

Heretofore, such broken links required manual correction. However, such manual correction is tedious, time consuming and potentially error prone. The computer software embodying the present invention enables restoration of broken links between master files and target files with minimal user intervention. More specifically, the present invention utilizes a two step process, namely "Inoculate" and "Cure", to create secondary links between master files and target files that enable broken primary links between master files and target files to be reestablished.

Figure 4A:
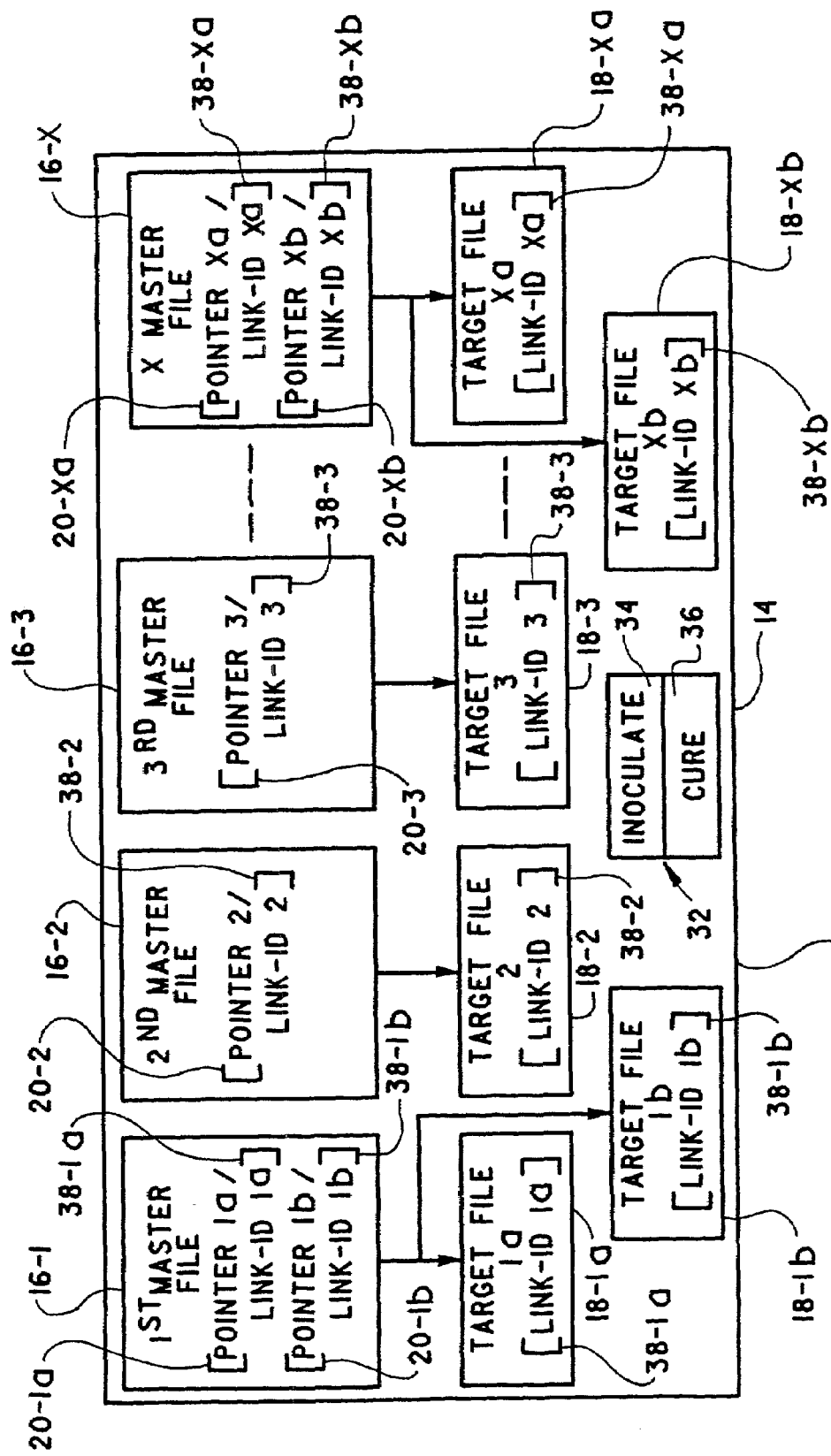
FIGS. 4a and 4b are block diagrams of a method of reestablishing broken links between master files and target files in accordance with one embodiment of the present invention.

The inoculate process will now be described with reference to FIG. 4a which shows an executable file 32 which includes an inoculate routine 34 and a cure routine 36, each of which can be selectively executed by a user of a computer 2 via the man-machine interface thereof or at scheduled intervals. Inoculate routine 34 is preferably executed prior to the creation of broken links on computer data storage 14. However, this is not to be construed as limiting the invention since inoculate routine 34 can be executed at anytime to provide secondary links between master files and target files having primary links that are not broken. For the purpose of the following description, it will be assumed that during execution of inoculate routine 34, all file links between master files and target files are not broken. In operation, inoculate routine 34 searches computer data storage 14 for master files 16 including one or more pointers 20 to target files 18. Utilizing the pointer data included in each pointer 20, inoculate routine 34 locates the storage location of the corresponding target file 18 in computer data storage 14. Next, inoculate routine 34 determines a link-id 38 for each target file 18 in computer data storage 14. Then, inoculate routine 34 stores each link-id 38 in its corresponding target file 18 and in each master file 16 configured to call the target file 18. For example, as shown in FIG. 4a, link-id 1a 38-1a for target file 1a 18-1a is stored therein and in master file 16-1 in connection with pointer 1a 20-1a for target file 1a 18-1a.

The foregoing process of locating the storage location in computer data storage 14 of each target file 18 having a pointer 20 included in a master file 16, determining a unique link-id 38 for each target file 18, and storing each link-id 38 in its corresponding target file 18 and in each master file 16 configured to call the target file 18 continues until each target file 18 and each master file 16 configured to call the target file 18 each include the link-id of the target file 18. Thereafter, inoculate routine 34 terminates.

It is to be appreciated that each pointer 20 and each link-id 38 operate as a primary link and a secondary link, respectively, between each target file 18 and each master file 16 configured to call the target file 18. During normal execution, each master file 16 can call one or more target files 18 from storage locations in computer data storage 14 referenced by the pointer data of the pointer 20 for each target file 18. If, however, this primary link between a master file 16 and a target file 18 is broken as a result of moving the target file 18 to a different storage location in computer data storage 14 and/or changing the file name and/or file extension of the target file 18, the master file 16 calling the target file 18 will not be able to locate it in computer data storage 14.

Figure 4B:
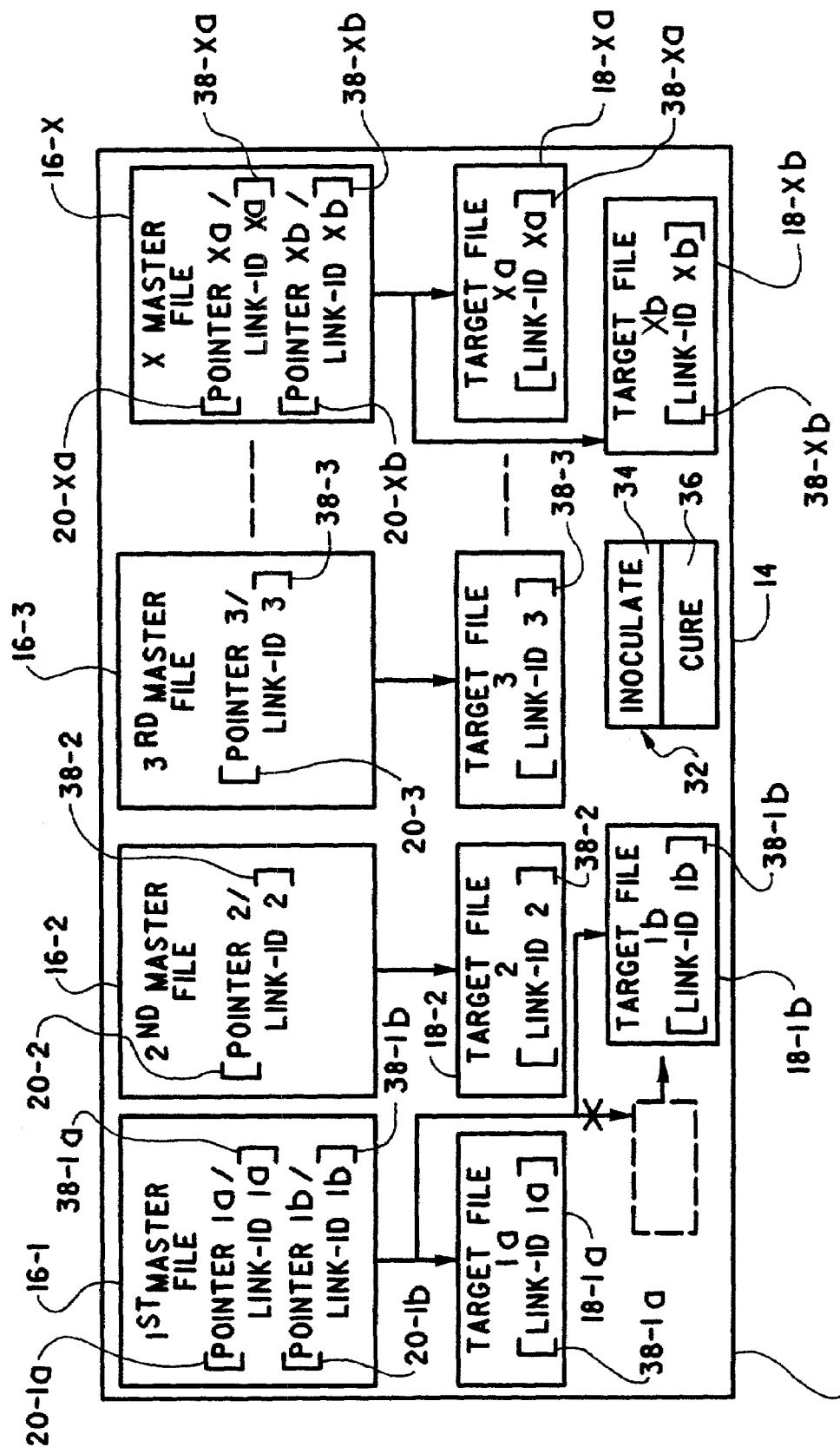

For example, FIG. 4b illustrates a change in the physical location of target file 1b 18-1b in computer data storage 14. Accordingly, the data included in pointer 1b 20-1b of master file 16-1 no longer points to the storage location of target file 1b 18-1b in computer data storage 14. To reestablish this broken link, cure routine 36 can be executed.

In operation, cure routine 36 searches computer data storage 14 for master files 16 including link-ids 38 to target files 18. For each link-id 38 encountered, cure routine 36 searches computer data storage 14 for the storage location of the target file 18 having the same link-id 38. Once this storage location has been determined, cure routine 36 updates the pointer data of the corresponding pointer 20 in the master file 16 configured to call the target file 18 so that the pointer data includes the current storage location of the target file 18 in computer data storage 14. For example, in FIG. 4b, since the storage location of target file 1b 18-1b in computer data storage changes, pointer 1b 20-1b does not include pointer data that enables master file 16-1 to locate target file 1b 18-1b in computer data storage 14. To reestablish this broken link, cure routine 36 searches the target files 18 stored in computer data storage 14 for a match between link-id 1b 38-1b stored in first master file 16-1 and link-id 1b 38-1b stored in target file 1b 18-1b. When a match is detected, cure routine 36 updates the pointer data in pointer 1b 20-1b to include the current storage location of target file 1b 18-1b in computer data storage 14. Thereafter, during execution of master file 16-1, target file 1b 18-1b can be readily called by first master file 16-1 at the storage location in computer data storage 14 referenced by the pointer data included in pointer 1b 20-1b.

If a target file 18 has a recognizable file structure, the link-id 38 determined for this target file 18 is a binary sequence that is unique to this target file 18 in computer data storage 14. This link-id 38 is then stored at predetermined locations in the file structure of the target file 18 and in each master file 16 configured to call the target file 18. However, if the target file 18 does not include a recognizable file structure, inoculate routine 34 calculates a checksum from the data comprising the target file 18 as the link-id 38 for this target file 18 and stores this link-id 38 at a predetermined location in each master file 16 configured to call the target file 18, but does not store this link-id 38 in the target file 18. As discussed above, the link-id 38 of each target file 18 is stored in the master file 16 configured to call the target file 18 in connection with the pointer 20 for this target file 18.

For each target file 18 having a unique binary sequence for its link-id 38, cure routine 36 reestablishes broken links in the manner described above. When a target file 18 has a checksum for its link-id 38 that is unique to the target file 18 in computer data storage 14, cure routine 36 reestablishes broken links in substantially the same manner as described above. However, since inoculate routine 34 did not store the checksum for the data comprising the target file therein, when cure routine 36 executes, it calculates the checksum from the data comprising each target file 18 as the link-id 38 for this target file 18 and uses this calculated link-id 38, in place of the link-id 38 stored in each target file 18 having a recognizable file structure, to reestablish broken links.

If two target files 18 have the same link-ids 38, these link-ids 38 will not provide sufficient information to reestablish broken links with their master files 16. In order to reestablish these broken links, cure routine 36 attempts to match the pointer data, i.e., physical/logical drive data 22, path data 24, file name data 26 and/or file extension data 28, of the pointer 20 to each target file 18 with data comprising the current storage location of the target file 18 on computer data storage 14. Providing one or more of these data 22–28 provide a unique match, the link between the target file 18 and the master file 16 configured to call the target file 18 can be reestablished. For example, if two target files 18 having the same link-ids are located by cure routine 36 when it is attempting to reestablish a broken link, cure routine 36 attempts to match the pointer data comprising pointer 20 associated with the link-id 38 of the target file 18 it is trying to locate with data comprising the current storage location of each of the located target files 18 having the same link-id. To this end, cure routine 36 first determines if there is a unique match between the file name data 26 stored in pointer 20 included in the master file 16 configured to call the target file 18 and the current file name of each target file 18 having the same link-id. If this match is inconclusive, cure routine 36 determines if there is a unique match between file extension data 28 stored in the pointer 20 of the master file 16 configured to call the target file 18 and the file extension data of each target files 18 having the same link-id. This process continues for physical/logical drive data 22 and path data 24 until a conclusive match is established with corresponding data of one of the target files 18 having the same link-id. Thereafter, cure routine 36 updates the pointer 20 in the master file 16 to include pointer data that references the current storage location of the corresponding target file 18 in computer data storage 14. The foregoing order of searching data 22–28 of a pointer 20 for two or more target files 18 having the same link-id is preferred since most file links are broken inadvertently and the file name data 26 of the target file 18 remains unchanged. However, this search order is not to be construed as limiting the invention.

If a conclusive match between a master file 16 and one of a plurality of target files 18 having the same link-ids cannot be established from data 22–28, a search can be made of date/time data associated with or stored in each target file 18 in a manner known in the art and the broken link reestablished based on the date/time data. For example, a link can be reestablished between a master file 16 and the target file 18 having the oldest date/time data based on the assumption that this target file 18 is the first of two or more copies. Alternatively, a link can be reestablished between a master file 16 and the target file 18 having the newest date/time data based on the assumption that this target file 18 is the most recently amended one of two or more copies. Since other assumptions may be utilized to reestablish a link between a master file 16 and one of plurality of target files 18 having the same link-ids, the foregoing assumptions are not to be construed as limiting the invention.

Figure 5A:
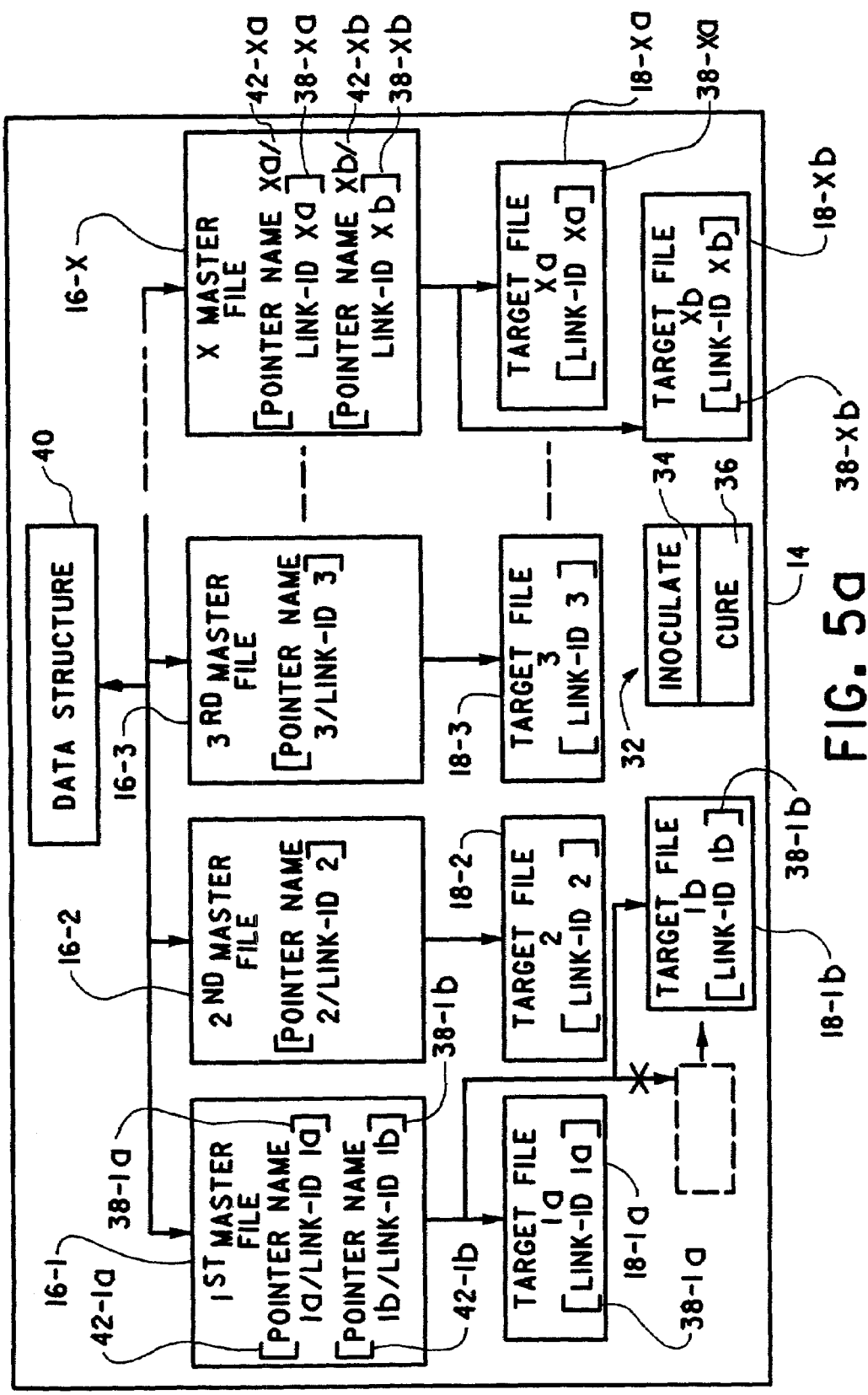
FIG. 5a is a block diagram of a method of reestablishing broken links between master files and target files in accordance with another embodiment of the present invention.

With reference to FIGS. 5a and 5b, in accordance with another embodiment of the present invention, computer data storage 14 can include a data structure 40. Data structure 40 includes a record 44 for each link between a master file 16 and a target file 18 in computer data storage 14. Each record 44 includes entries entitled pointer name 46 and pointer data 50.

In this embodiment, each master file 16 is configured to call each target file utilizing the pointer data 50 stored in data structure 40. More specifically, each master file 16 includes a pointer name 42 for each target file 18 it is configured to call. When executing a call for a target file 18, the calling master file 16 causes the pointer name 42 associated with the called target file 18 to be compared with pointer names 46 included in records 44 of data structure 40. In response to detecting a match between pointer names 42 and 46 included in the calling master file 16 and data structure 40, respectively, the calling master file 16 utilizes the pointer data 50 included in the record 44 associated with pointer name 46 to locate the storage location of the called target file 18 in computer data storage 14.

In the event two pointer names 46 are the same, data structure 40 can also include the master file name, e.g., master file 16-1, of the calling master file in a master file name 48 entry of each record 44. Matches between a pointer name 42 included in the calling master file 16 and pointer name 46 included in a record 44 of data structure 40, and, as necessary, the name of the calling master file 16 and the name of the calling master file 16 included in a master file name entry 48 of the record 44, can be utilized as a basis for identifying the pointer data 50 for the target file 18 being called by the master file 16.

In order to provide a method to reestablish broken links when the physical location of a target file in computer data storage 14 changes or when the path data 24, file name data 26 and/or extension data 28 of the target file changes, inoculate routine 34 can be executed to determine a link-id 38 for each target file 18, and to insert this link-id in the target file 18 and in each master file 16 configured to call the target file 18. In this embodiment, each link-id 38 is associated with the pointer name 42 of the target file 18 in one of the master files 16.

At an appropriate time when it is desired to reestablish broken links, cure routine 36 is executed. In the manner discussed above in connection with FIGS. 4a and 4b, cure routine 36 utilizes link-ids 38 to determine each target file 18 that is called by a master file 16 and the storage location in computer data storage 14 of each target file 18. Cure routine 36 then matches the pointer name 42 associated with each link-id 38 with a pointer name 46 included in a record 44 of data structure 40 and updates the pointer data 50 of this record 44 with the current storage location of the corresponding target file 18 in computer data storage 14.

For example, FIG. 5a shows that inoculated target file 1b 18-1b has been moved in computer data storage 14. In operation, cure routine 36 utilizes link-id 1b 38-1b stored in master file 16-1 and in target file 1b 18-1b to determine the current storage location of target file 1b 18-1b in computer data storage 14. Next, cure routine 36 searches data structure 40 for a match between pointer name 1b 42-1b associated with link-id 1b 38-1b stored in master file 16-1 and pointer name 1b included in the entry for pointer name 46 of a record 44 of data structure 40. In response to detecting a match, cure routine 36 updates the entry of the pointer data 50 of the record 44 having pointer name 1b to include the current storage location of target file 1b 18-1b in computer data storage 14.

Figure 6A:
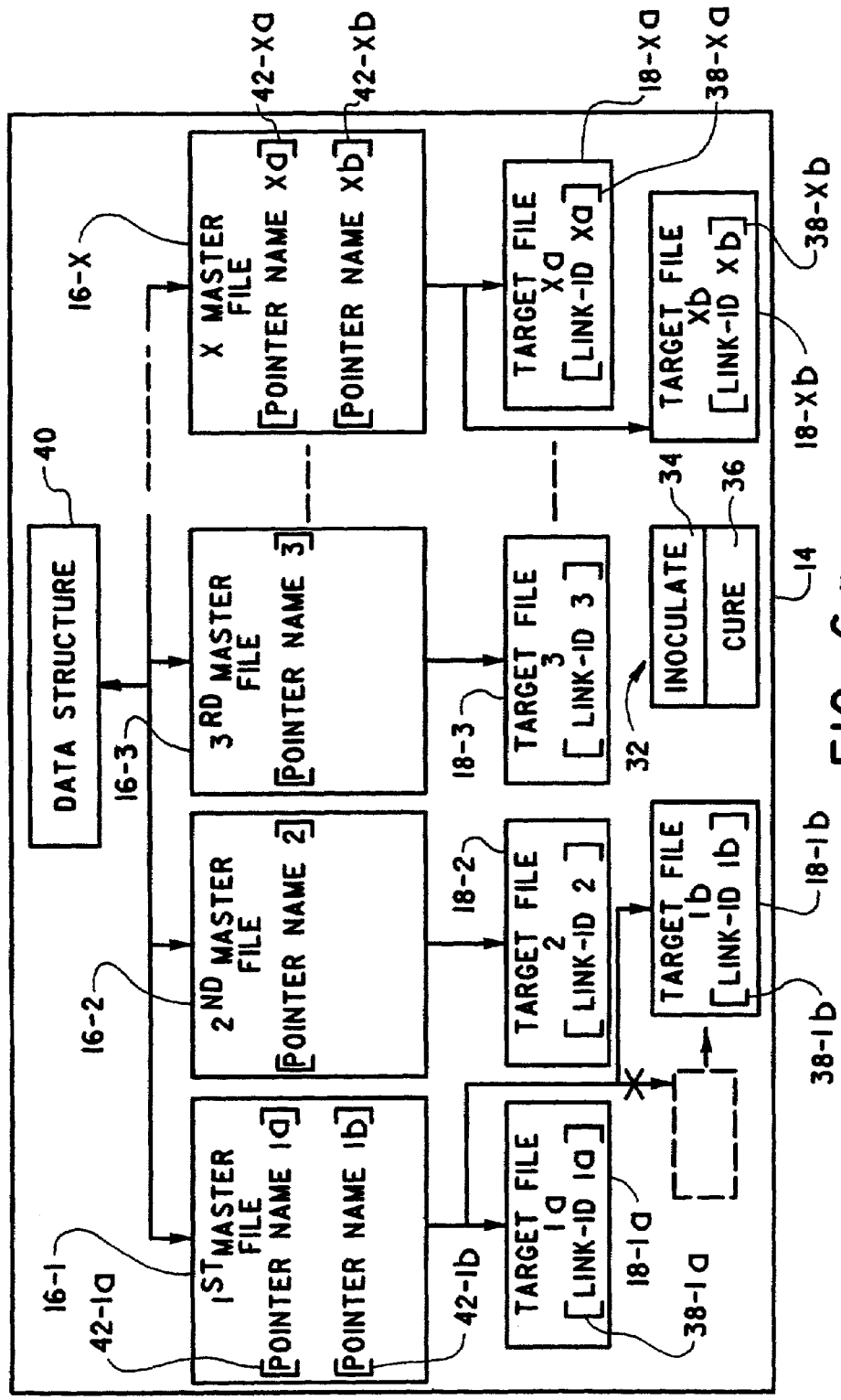
FIG. 6a is a block diagram of a method of reestablishing broken links between master files and target files in accordance with yet another embodiment of the present invention.

With reference to FIGS. 6a and 6b, in accordance with another embodiment of the present invention, inoculate routine 34 can be configured to determine a unique link-id 38 for each target file 18 called by a master file 16 and can include this unique link-id 38 in the corresponding target file 18 and in a link-id name entry 52 of the corresponding record 44 of data structure 40.

At an appropriate time when it is desired to reestablish broken links, cure routine 36 is executed. In this embodiment, cure routine 36 matches the link-id 38 of each target file with a link-id stored in a link-id name entry 52 of a record 44 of data structure 40 and updates the pointer data entry 50 of this record 44 to include the current storage location of the target file in computer data storage 14.

For example, in FIG. 6a, inoculated target file 1b 18-1b has been moved in computer data storage 14. In operation, cure routine 36 matches the link-id 1b 38-1b stored in target file 1b 18-1b with the corresponding link-id stored in a link-id name entry 52 of a record 44 of data structure 40. Based on this match, cure routine 36 updates the pointer data 50 of this record 44 to include the current storage location of target file 1b 18-1b in computer data storage 14.

An advantage of the embodiment described in connection with FIGS. 5a and 5b includes not having to update pointer data of pointers in each master file 16 when executing cure routine 36. Advantages of the embodiment described in connection with FIGS. 6a and 6b include not having to include link-ids or pointers in each master file 16 configured to call a target file 18, and the use of data structure 40 as a storage location for records 44 that create the necessary links between each target file, its storage location in computer data storage 14 and the pointer name 42 included in the corresponding master file 16.

The present invention has been described with reference to the preferred embodiments. Obvious modifications and alterations will occur to others upon reading and understanding the proceeding detailed description. It is intended that the invention be construed as including all such modifications and alterations insofar as they come within the scope of the appended claims or the equivalents thereof.

The invention claimed is:

1. A method of correcting broken software file links comprising the steps of:
   (a) determining a link-id for a first target file that is stored on a computer data storage along with a first master file which, during its execution, calls the first target file, where the first master file includes a pointer comprised of data that the first master file utilizes to locate the first target file on the computer data storage;
   (b) storing the link-id of the first target file in the first target file and in the first master file;
   (c) locating the first target file on the computer data storage based on a match between the link-id stored in the first master file and the link-id stored in the first target file; and
   (d) updating the data of the pointer so that said data enables the first master file to locate the first target file on the computer data storage.

2. The method as set forth in claim 1, wherein step (c) occurs after the first target file is one of amended and moved so that the first master file cannot locate the first target file on the computer data storage from the data comprising the pointer.

3. The method as set forth in claim 2, wherein:
   amending the first target file includes amending at least one of a file name, a file extension, a path, and a physical/logical drive of the first target file; and
   moving the first target file includes moving the first target file to at least one of a different physical/logical drive and a different path of the computer data storage.

4. The method as set forth in claim 1, wherein, prior to and after updating the data of the pointer in step (d), said data comprises at least one of:
   respective pre-update and post-update file names of the first target file;
   respective pre-update and post-update file extensions of the first target file;
   respective pre-update and post-update physical/logical drives where the first target file is stored on the computer data storage; and
   respective pre-update and post-update paths or folders where the first target file is stored on the computer data storage.

5. The method as set forth in claim 1, wherein:
   the link-id is one of a unique binary sequence and a checksum of the data comprising the first target file;
   when the link-id is a unique binary sequence, step (b) includes the step of storing the link-id in the first target file; and
   when the link-id is the checksum of the data comprising the first target file, step (c) includes the step of determining the link-id of the first target file again.

6. The method as set forth in claim 1, further including the steps of:
   storing on the computer data storage a second target file; and
   determining a link-id for the second target file, where the link-ids of the first and second target files are the same, wherein step (c) includes the steps of:
   determining in connection with the first master file that the first and second target files have the same link-id; and
   locating the first target file on the computer data storage based on at least one of (i) the data comprising the pointer and (ii) a date/time associated with each of the first and second target files.

7. A method of correcting broken software file links comprising the steps of:
   (a) determining a link-id for each of a plurality of target files stored on a computer data storage along with a plurality of master files, each master file configured to call at least one target file during execution of said master file, each master file including for each target file configured to be called thereby a pointer, each pointer comprising data that enables said master file to locate a storage location where the target file corresponding to said pointer resides on the computer data storage;
   (b) storing the link-id of each target file therein and in each master file configured to call the target file;
   (c) locating at least one target file on the computer data storage based on a match between the link-id stored in said target file and the link-id stored in at least one master file configured to call said target file; and
   (d) updating the data comprising the pointer of the at least one master file configured to call said target file so that said pointer data enables said master file to locate said target file on the computer data storage.

8. The method as set forth in claim 7, wherein step (c) occurs after said target file has been one of amended and moved so that each master file configured to call said target file cannot locate said target file from the corresponding pointer data.

9. The method as set forth in claim 8, wherein:
   amending at least one target file includes amending at least one of a file name, a file extension, a path, and a physical/logical drive of said target file; and
   moving at least one target file includes moving said target file to at least one of a different physical/logical drive and a different path of the computer data storage.

10. The method as set forth in claim 7, wherein:
   the link-id of each target file includes one of a checksum of the data comprising said target file and a unique binary sequence;
   when the link-id is a unique binary sequence, step (b) includes the step of storing the link-id in the target file; and
   when the link-id is the checksum of the data comprising the first target file, step (c) includes the step of determining the link-id of the target file again.

11. The method as set forth in claim 7, wherein, when the link-ids of at least two target files are the same, step (c) includes the step of locating the at least one target file on the computer data storage utilizing at least one of (i) the data comprising the pointer for the at least one target file and (ii) a date/time associated with the at least one target file.

12. The method as set forth in claim 11, wherein the data comprising each pointer includes at least one of the following:
   a file name of said target file;
   a file extension of said target file;
   a physical/logical drive where said target file resides on the computer data storage; and a path of said target file on the computer data storage.

13. A method of correcting broken software file links comprising the steps of:
(a) determining a link-id for a first target file that is stored on a computer data storage along with a first master file which, during its execution, calls the first target file, the computer data storage also including a pointer stored in a data structure accessible to the first master file for enabling the first master file to locate the first target file on the computer data storage, the pointer comprising data regarding a location of the first target file on the computer data storage;
(b) storing the link-id of the first target file therein and in the data structure of the computer data storage in connection with the first master file;
(c) determining a location of the first target file on the computer data storage based on a match between the link-id stored in the first target file and the link-id stored in the data structure of the computer data storage in connection with the first master file after the first target file has been at least one of amended and relocated on the computer data storage so that the first master file cannot locate the first target file on the computer data storage utilizing the data comprising the pointer; and
(d) updating the data of the pointer so that said updated data enables the first master file to locate the first target file on the computer data storage at the location determined in step (c) without the use of the link-id.

14. The method as set forth in claim 13, wherein:
amending the first target file includes amending at least one of a file name, a file extension, a path, and a physical/logical drive of the first target file; and
moving the first target file includes moving the first target file to at least one of a different physical/logical drive and a different path of the computer data storage.

15. The method as set forth in claim 13, wherein:
the link-id is one of a unique binary sequence and a checksum of the data comprising the first target file;
when the link-id is a unique binary sequence, step (b) includes the step of storing the link-id in the first target file; and
when the link-id is the checksum of the data comprising the first target file, step (c) includes the step of determining the link-id of the first target file again.

16. The method as set forth in claim 13, further including the steps of:
storing on the computer data storage a second target file; and
determining a link-id for the second target file, where the link-ids of the first and second target files are the same, wherein step (c) includes the steps of:
determining in connection with the first master file that the first and second target files have the same link-id; and
determining a location of the first target file on the computer data storage utilizing at least one of (i) the data comprising the pointer and (ii) a date/time associated with the first and second target files.

17. The method as set forth in claim 13, further including the steps of:
storing the pointer in a data structure accessible by the first master file;
in response to calling the first target file, the first master file locates the pointer for the first target file in the data structure; and
the first master file locates the first target file on the computer data storage utilizing the data comprising the pointer for the first target file located by the first master file in the data structure.

18. The method as set forth in claim 13, wherein the pointer is stored in the first master file.

19. A method of correcting broken software file links comprising the steps of:
(a) determining a link-id for each of a plurality of target files stored on a computer data storage along with a plurality of master files, where each target file is called by at least one master file during its execution, the computer data storage also including for each target file a pointer stored in a data structure that is accessible to the at least one master file configured to call said target file, each pointer comprising data regarding a location of its target file on the computer data storage;
(b) storing the link-id of each target file therein and in the data structure of the computer data storage in connection with at least one master file configured to call the target file;
(c) determining a location of at least one target file on the computer data storage based on a match between the link-id stored in said target file and the link-id stored in the data structure of the computer data storage in connection with the at least one master file configured to call said target file after said target file has been at least one of amended and relocated on the computer data storage so that the at least one master file configured to call said target file cannot locate said target file from the pointer for said target file; and
(d) updating the data comprising the pointer for said target file so that said data enables the master file configured to call said target file to locate said target file on the computer data storage at the location determined in step (c) without the use of the link-id.

20. The method as set forth in claim 19, further including the steps of:
storing each pointer in a data structure accessible by the master files;
locating the pointer for said target file in the data structure; and
locating said target file on the computer data storage utilizing the data comprising the pointer for said target file located in the data structure.

21. The method as set forth in claim 19, wherein each pointer is stored in the master file configured to call said target file.

* * * * *

UNITED STATES PATENT AND TRADEMARK OFFICE
CERTIFICATE OF CORRECTION

| | | |
|---|---|---|
| PATENT NO. | : 7,032,124 B2 | Page 1 of 1 |
| APPLICATION NO. | : 10/093559 | |
| DATED | : April 18, 2006 | |
| INVENTOR(S) | : Greenbaum | |

It is certified that error appears in the above-identified patent and that said Letters Patent is hereby corrected as shown below:

Column 7, Line 65, delete -- the name of the calling master file 16 and --.

Signed and Sealed this

Eighth Day of August, 2006

JON W. DUDAS
*Director of the United States Patent and Trademark Office*